US011880330B2

(12) United States Patent
Liu et al.

(10) Patent No.: US 11,880,330 B2
(45) Date of Patent: *Jan. 23, 2024

(54) NETWORK-ON-CHIP DATA PROCESSING METHOD AND DEVICE

(71) Applicant: Shanghai Cambricon Information Technology Co., Ltd., Pudong New Area (CN)

(72) Inventors: Shaoli Liu, Pudong New Area (CN); Zhen Li, Pudong New Area (CN); Yao Zhang, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,492

(22) Filed: Dec. 29, 2021

(65) Prior Publication Data

US 2022/0121600 A1 Apr. 21, 2022

Related U.S. Application Data

(63) Continuation of application No. 17/278,812, filed as application No. PCT/CN2019/111977 on Oct. 18, 2019.

(30) Foreign Application Priority Data

Oct. 18, 2018 (CN) .......................... 201811215820.7
Oct. 18, 2018 (CN) .......................... 201811215978.4
(Continued)

(51) Int. Cl.
*G06F 13/40* (2006.01)
*G06N 3/04* (2023.01)

(52) U.S. Cl.
CPC ........... *G06F 13/4068* (2013.01); *G06N 3/04* (2013.01)

(58) Field of Classification Search
CPC .. G06F 13/4068; G06F 15/161; G06F 9/3891; G06F 9/3828; G06N 3/04
See application file for complete search history.

(56) References Cited

U.S. PATENT DOCUMENTS 11,514,291 B2 * 11/2022 Baum ..................... G06N 3/045
2009/0128571 A1 5/2009 Smith et al.
(Continued)

FOREIGN PATENT DOCUMENTS

CN 101227486 A 7/2008
CN 102075578 A 5/2011
(Continued)

OTHER PUBLICATIONS

CN 201811215820.7—First Office Action, dated Aug. 26, 2021, 31 pages. (with English translation).
(Continued)

*Primary Examiner* — Idriss N Alrobaye
*Assistant Examiner* — Richard B Franklin
(74) *Attorney, Agent, or Firm* — Getech Law LLC; Jun Ye

(57) ABSTRACT

The present application relates to a network-on-chip data processing method. The method is applied to a network-on-chip processing system, the network-on-chip processing system is used for executing machine learning calculation, and the network-on-chip processing system comprises a storage device and a calculation device. The method comprises: accessing the storage device in the network-on-chip processing system by means of a first calculation device in the network-on-chip processing system and obtaining first operation data; performing an operation on the first opera- (Continued)

tion data by means of the first calculation device to obtain a first operation result; and sending the first operation result to a second calculation device in the network-on-chip processing system. According to the method, operation overhead can be reduced and data read/write efficiency can be improved.

12 Claims, 8 Drawing Sheets

(30) Foreign Application Priority Data

| Oct. 18, 2018 | (CN) | 201811216718.9 |
|---|---|---|
| Oct. 18, 2018 | (CN) | 201811216857.1 |
| Nov. 21, 2018 | (CN) | 201811390409.3 |
| Nov. 21, 2018 | (CN) | 201811390428.6 |
| Nov. 21, 2018 | (CN) | 201811392232.0 |
| Nov. 21, 2018 | (CN) | 201811392262.1 |
| Nov. 21, 2018 | (CN) | 201811392270.6 |
| Nov. 21, 2018 | (CN) | 201811392279.7 |
| Nov. 21, 2018 | (CN) | 201811393352.2 |

(56) References Cited

U.S. PATENT DOCUMENTS

| 2012/0303848 A1 | 11/2012 | Vallapaneni et al. |
| 2012/0303933 A1 | 11/2012 | Manet et al. |
| 2017/0083338 A1 | 3/2017 | Burger et al. |
| 2017/0147513 A1* | 5/2017 | Hilton ............... G06F 13/1663 |
| 2018/0004518 A1 | 1/2018 | Plotnikov et al. |

FOREIGN PATENT DOCUMENTS

| CN | 102591759 A | 7/2012 |
| CN | 102868644 A | 1/2013 |
| CN | 103218208 A | 7/2013 |
| CN | 103580890 A | 2/2014 |
| CN | 105183662 A | 12/2015 |
| CN | 107316078 A | 11/2017 |
| CN | 107578095 A | 1/2018 |
| CN | 107920025 A | 4/2018 |
| CN | 107992329 A | 5/2018 |
| CN | 108427990 A | 8/2018 |
| CN | 108431770 A | 8/2018 |
| CN | 108470009 A | 8/2018 |
| JP | H01179515 A | 7/1989 |
| JP | H04507027 A | 12/1992 |
| JP | 105274455 A | 10/1993 |
| JP | H09120391 A | 5/1997 |
| JP | 2738141 B2 | 4/1998 |
| JP | 2001501755 A | 2/2001 |
| JP | 2006286002 A | 10/2006 |
| JP | 2008301109 A | 12/2008 |
| JP | 2015509183 A | 3/2015 |
| JP | 2018514872 A | 6/2018 |
| KR | 100520807 B1 | 10/2005 |
| KR | 1020100044278 A | 4/2010 |
| KR | 1020100125331 A | 11/2010 |
| KR | 101306354 B1 | 9/2013 |
| KR | 1020160127100 A | 11/2016 |
| KR | 1020170125396 A | 11/2017 |
| WO | 2015087424 A1 | 6/2015 |
| WO | 2017185418 A1 | 11/2017 |
| WO | 2018103736 A1 | 6/2018 |
| WO | 2018126073 A1 | 7/2018 |

OTHER PUBLICATIONS

CN 201811215978.4—First Office Action, dated Aug. 26, 2021, 32 pages. (with English translation).
CN 201811216718.9—First Office Action, dated Aug. 26, 2021, 21 pages. (with English translation).
CN 201811390409.—First Office Action, dated Feb. 20, 2021, 10 pages. (with English translation).
CN 201811392232.0—First Office Action, dated Feb. 10, 2021, 11 pages. (with English translation).
CN 201811392270.6—First Office Action, dated Aug. 18, 2021, 12 pages. (with English translation).
JP 2020206272—Notice of Reasons for Refusal, dated Nov. 24, 2021, 7 pages. (with English translation).
JP 2020206281—Notice of Reasons for Refusal, dated Dec. 9, 2021, 8 pages. (with English translation).
JP 2020206293—Notice of Reasons for Refusal, dated Dec. 9, 2021, 8 pages. (with English translation).
JP 2020206306—Notice of Reasons for Refusal, dated Dec. 9, 2021, 8 pages. (with English translation).
JP 2020569113—Notice of Reasons for Refusal, dated Nov. 24, 2021, 7 pages. (with English translation).
EP 19873122.6—Extended European Search Report, dated May 20, 2022, 13 pages.
EP 21217802.4—Extended European Search Report, dated May 3, 2022, 11 pages.
EP 21217809.9—Extended European Search Report, dated May 10, 2022, 11 pages.
EP 21217811.5—Extended European Search Report, dated May 9, 2022, 11 pages.
KR 10-2020-7034133—Notification of Reason for Refusal, dated Jul. 14, 2022, 11 pages.
KR 10-2020-7034126—Office Action, dated Jul. 25, 2022, 13 pages.
KR 10-2020-7034138—Office Action, dated Jul. 19, 2022, 15 pages.
CN201811216857.1—Chinese Office Action dated Jan. 3, 2023, 22 pages. (With Brief English Explanation).
Ebrahimi et al., "Cluster-based topologies for 3D Networks-on-Chip using advanced inter-layer bus architecture", Journal of Computer and System Sciences, vol. 79, Issue 4, Jun. 2013, pp. 475-491.
PCT /CN2019/111977—International Search Report and Written Opinion dated Jan. 22, 2020, 13 pages.
KR 10-2020-7034145—Office Action, dated Jul. 25, 2022, 9 pages. (With brief English explanation).
CN201811216857.1—Second Office Action dated Jun. 1, 2023, 19 pages. (With Brief English Explanation).
KR20207034126—Written Decision on Registration dated May 8, 2023, 6 pages.
KR20207034133—Written Decision on Registration dated May 8, 2023, 6 pages.
KR20207034138—Written Decision on Registration dated May 8, 2023, 6 pages.
KR20207034145—Written Decision on Registration dated May 8, 2023, 6 pages.

* cited by examiner

NETWORK-ON-CHIP DATA PROCESSING METHOD AND DEVICE

CROSS REFERENCES

This application is a continuation of U.S. patent application Ser. No. 17/278,812, filed Mar. 23, 2021, which is a 371 of International Application PCT/CN2019/111977, filed Oct. 18, 2019, which claims the benefit of priority from Chinese Application No. 201811216718.9 with the title of "Network-On-Chip Processing System and Network-On-Chip Data Processing Method", Chinese Application No. 201811215820.7 with the title of "Network-On-Chip Processing System and Network-On-Chip Data Processing Method", Chinese Application No. 201811215978.4 with the title of "Network-on-Chip Processing System and Network-on-Chip Data Processing Method", and Chinese Application No. 201811216857.1 with the title of "Network-on-Chip Data Processing Method, Storage Medium, Computer Equipment and Device", all of which were filed on Oct. 18, 2018; this application also claims the benefit of priority from Chinese Application No. 201811392232.0 with the title of "Data Processing Method, Device, and Related Product", Chinese Application No. 201811392262.1 with the title of "Data Processing Method, Device, and Related Product", Chinese Application No. 201811392279.7 with the title of "Data Processing Device, Method, and Related Product", Chinese Application No. 201811393352.2 with the title of "Data Processing Device, Method, and Related Product", Chinese Application No. 201811390409.3 with the title of "Data Processing Device, Method, and Related Product", Chinese Application No. 201811390428.6 with the title of "Data Processing Device and Related Product", and Chinese Application No. 201811392270.6 with the title of "Data Processing Device and Related Product", all of which were filed on Nov. 21, 2018. The disclosures of the above applications are incorporated herein by reference in their entirety.

TECHNICAL FIELD

The present disclosure relates to the field of information processing technology, and particularly relates to a network-on-chip data processing method and device.

BACKGROUND

With the development of semi-conductor technology, it has become a reality to integrate hundreds of millions of transistors on a single chip. The network-on-chip (NoC) is capable of integrating plenty of computation resources on a single chip and implementing on-chip communication.

As plenty of computations are required in a neural network, some of the computations, such as a forward operation, a backward operation, and weight update, need to be processed in parallel. In a chip architecture with a large number of transistors, chip design may face problems such as high memory access overhead, high bandwidth blockage, and low data reading/writing efficiency.

SUMMARY

In order to at least overcome the problems existing in the related technology to a certain extent, the present disclosure provides an interaction method, a device, and a smart terminal.

An embodiment of the present disclosure provides a network-on-chip (NoC) processing system. The system includes: a storage device and a plurality of computation devices, where the storage device and the plurality of computation devices are arranged on a same chip. At least one computation device is connected to the storage device, and at least two computation devices are connected to each other.

In an embodiment, any two of the plurality of computation devices are directly connected to each other.

In an embodiment, the plurality of computation devices include a first computation device and a plurality of second computation devices, where the first computation device is connected to the storage device, and at least one of the plurality of second computation devices is connected to the first computation device.

In an embodiment, at least two of the plurality of second computation devices are connected to each other, and are connected to the storage device through the first computation device.

In an embodiment, any two of the plurality of second computation devices are directly connected to the first computation device.

In an embodiment, each of the plurality of computation devices is connected to the storage device, and at least two computation devices are connected to each other.

An embodiment of the present disclosure provides a data processing device, where the device includes a machine learning device, a transmission circuit, and a shared memory. The machine learning device includes at least one machine learning unit, where a unicast read operation and a broadcast operation performed by the machine learning unit share a same data receiving interface. The machine learning unit is connected to the transmission circuit through a sending interface and a shared data receiving interface, and the transmission circuit is connected to the shared memory; and the transmission circuit is configured to obtain input data required by the machine learning device from the shared memory according to a data operation signal sent by the machine learning device through the sending interface, and return the input data to the machine learning device through the shared data receiving interface.

In an embodiment, the machine learning device is configured to perform a machine learning operation according to the input data to obtain output data.

In an embodiment, the machine learning device is further configured to transfer the output data to the shared memory through the transmission circuit for data storage.

In an embodiment, the sending interface includes: a unicast read signal sending interface and a broadcast signal sending interface. The machine learning unit is connected to the transmission circuit through the unicast read signal sending interface and the shared data receiving interface respectively to implement the unicast read operation, and is connected to the transmission circuit through the broadcast signal sending interface and the shared data receiving interface to implement the broadcast operation.

In an embodiment, the transmission circuit includes: a second transmission interface, a read/write processing circuit connected to the second transmission interface, and an arbitration circuit connected to the read/write processing circuit, where the read/write processing circuit is configured to receive a data operation signal sent by the at least one machine learning unit through the transmission interface and the second transmission interface, transmit the data operation signal to the arbitration circuit, and return the data obtained by the arbitration circuit from the shared memory to the machine learning unit corresponding to the data operation signal through the second transmission interface and the shared data receiving interface; and the arbitration circuit is configured to arbitrate the data operation signal received from the read/write processing circuit according to a preset arbitration rule, and operate the data in the shared memory according to the data operation signal that has been successfully arbitrated.

In an embodiment, the read/write processing circuit includes: a unicast read processing circuit and a broadcast processing circuit, where the unicast read processing circuit is configured to process a unicast read signal, and the broadcast processing circuit is configured to process a broadcast signal and/or a multicast signal.

In an embodiment, the second transmission interface includes: at least one cluster of unicast read signal receiving interface and unicast read data sending interfaces that are connected to the unicast read processing circuit, and at least one cluster of broadcast signal receiving interfaces and broadcast data sending interfaces that are connected to the broadcast processing circuit, where the unicast read signal receiving interfaces are connected to the unicast read signal sending interfaces of the machine learning unit, the broadcast signal receiving interfaces are connected to the broadcast signal sending interfaces of the machine learning unit, and the unicast read data sending interfaces and the broadcast data sending interfaces in the transmission circuit are respectively connected to the shared data receiving interface of the machine learning unit.

In an embodiment, the read/write processing circuit includes: a broadcast processing circuit and a plurality of unicast read processing circuits, where the plurality of unicast read processing circuits and the plurality of machine learning units are connected one to one, and the broadcast processing circuit and the plurality of machine learning units are connected one-to-many.

In an embodiment, the second transmission interface includes: a cluster of broadcast interfaces connected to the broadcast processing circuit, where each of the broadcast interfaces include a broadcast signal receiving interface and a broadcast data sending interface. The plurality of machine learning units are connected to the broadcast processing circuit through the cluster of broadcast processing interfaces.

In an embodiment, the second transmission interface includes: a plurality of clusters of unicast read signal receiving interfaces and shared read data sending interfaces that are one-to-one connected to the plurality of unicast read processing circuit, and a broadcast signal receiving interface that is connected to the broadcast processing circuit, where each of the unicast read signal receiving interfaces is connected to each of the unicast read signal sending interfaces of the machine learning unit, each of the broadcast signal receiving interfaces is connected to each of the broadcast signal sending interfaces of the machine learning unit, and each of the shared data sending interfaces is connected to each of the shared data receiving interfaces of the machine learning unit.

An embodiment of the present disclosure further provides a data processing method which is applied to a data processing device. The data processing device includes: a machine learning device, a transmission circuit, and a shared memory. The machine learning device includes at least one machine learning unit, where a unicast read operation and a broadcast operation performed by the machine learning unit share a same data receiving interface. The machine learning unit is connected to the transmission circuit through a sending interface and a shared data receiving interface, and the transmission circuit is connected to the shared memory. The method includes:

sending, by the machine learning device, a data operation signal to the transmission circuit through the sending interface; and obtaining, by the transmission circuit, input data required by the machine learning device from the shared memory according to the data operation signal, and returning the input data to the machine learning device through the shared data receiving interface.

In an embodiment, the data operation signal is a broadcast signal and/or a multicast signal, and the returning the input data to the machine learning device through the shared data receiving interface includes:

sending, by the transmission circuit, the input data to a plurality of machine learning units corresponding to the broadcast signal and/or the multicast signal through the shared data receiving interface.

In an embodiment, the input data includes input data, and the output data includes output data.

An embodiment of the present disclosure provides a neural network operation device, where the operation device includes one or more computation devices in the Noc processing system. The neural network operation device is configured to obtain data to be operated and control information from other processing devices, execute a specified machine learning operation, and transfer an execution result to other processing devices through an I/O interface.

When the neural network operation device includes a plurality of the computation devices, the plurality of computation devices may be interconnected and transfer data to each other through a specific structure, where the plurality of computation devices are interconnected and transfer data to each other through a PCIE bus to support a larger-scale machine learning operation; the plurality of computation devices share a same control system or have respective control systems; the plurality of computation devices share a memory or have respective memories; and an interconnection mode of the plurality of computation devices is any interconnection topology.

An embodiment of the present disclosure provides a combined processing device, where the combined processing device includes the neural network operation device, a universal interconnection interface, and other processing devices. The neural network operation device interacts with the other processing devices to jointly complete operations specified by a user. The combined processing device may also include a storage device, where the storage device is connected to the neural network operation device and the other processing devices respectively, and the storage device is configured to store data of the neural network computation device and the other processing devices.

An embodiment of the present disclosure provides a neural network chip, where the chip includes the computation device in the NoC processing system, the neural network computation device, or the combined processing device.

An embodiment of the present disclosure provides a neural network chip package structure, where the package structure includes the neural network chip.

An embodiment of the present disclosure provides a board card, where the board card includes the neural network chip package structure.

In an embodiment, the input data includes input neuron data and/or weight data; and the output data includes output neuron data.

It should be understood that the above general descriptions and the following detailed descriptions are only exemplary and illustrative, and are not intended to limit the present disclosure.

BRIEF DESCRIPTION OF THE DRAWINGS

The accompanied drawings herein are incorporated into the specification and constitute a part of the specification, illustrate embodiments that conform to the present disclosure, and are used together with the specification to explain principles of the present disclosure.

DETAILED DESCRIPTION OF THE EMBODIMENTS

The exemplary embodiments will be described in detail, and examples thereof are shown in the accompanied drawings. Unless otherwise indicated, identical numbers in different drawings indicate identical or similar elements. The implementation manners described in the following exemplary embodiments do not represent all implementation manners consistent with the present disclosure. On the contrary, the implementation manners are only examples of devices and methods which are consistent with some aspects of the present disclosure and specifically described in the appended claims.

With the continuous development of information technology, the demand for data access and data processing becomes higher, which leads to higher requirements for processors that process data and access data. For example, for a general-purpose processor, a multi-core processor composed of a plurality of general-purpose processor cores (such as CPU cores) has become a mainstream due to powerful parallel computation capabilities.

However, with continuous development of machine learning algorithms, machine learning chips with more architectures gradually come out. These machine learning chips usually need to access or process data in the shared storage in a plurality of forms such as unicast reading or broadcasting, thus a plurality of corresponding transmission interfaces are arranged, which may lead to a large area of machine learning chips.

Therefore, how to simplify a transmission interface of a machine learning chip to reduce an area of the machine learning chip has become an urgent technical problem to be solved by current technicians.

To solve the above problem, the present disclosure provides the following technical solutions.

Figure 1:
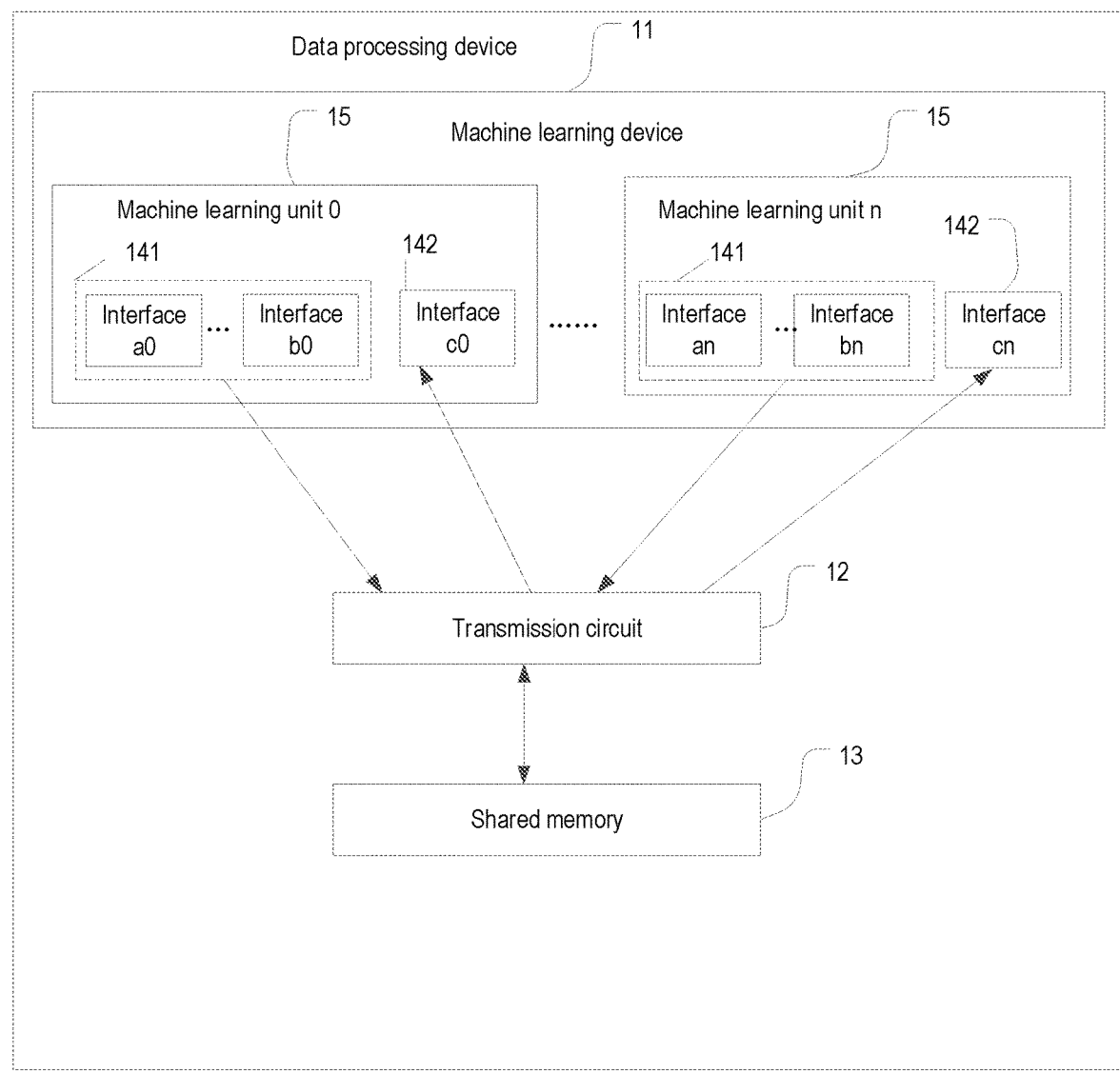
FIG. 1 is a schematic structural diagram of a data processing device according to an embodiment.

A data processing device provided in an embodiment of the present disclosure may be implemented by software, hardware, or a combination of software and hardware, and may be part or all of the data processing device shown in FIG. 1. The data processing device may include a machine learning device 11, a transmission circuit 12, and a shared memory 13. The machine learning device 11 includes at least one machine learning unit 15, where a unicast read operation and a broadcast operation performed by the machine learning unit 15 share a same data receiving interface 142, the machine learning unit is connected to the transmission circuit 12 through a sending interface 141 and a shared data receiving interface 142, and the transmission circuit 12 is connected to the shared memory 13. The transmission circuit 12 is configured to obtain input data required by the machine learning device from the shared memory 13 according to the data operation signal sent by the machine learning device 11 through the sending interface 141, and return the input data to the machine learning device 11 through the shared data receiving interface 142. It should be noted that the above machine learning unit 15 may include a first transmission interface 14 (not shown in the figure), and the first transmission interface may include the sending interface 141 and the shared data receiving interface 142.

Optionally, the machine learning device 11 is configured to perform a machine learning operation according to the input data to obtain output data. Optionally, the machine learning device 11 is further configured to transfer the output data to the shared memory 13 through the transmission circuit 12 for data storage. Specifically, when the machine learning device 11 is configured to perform a neural network operation, the device 11 may perform an artificial neural network operation according to input neuron data and weight data to obtain output neuron data, use the output neuron data as new input neuron data, and transfer the new input neuron data to the shared memory 13 through the transmission circuit 12 for data storage.

It should be noted that the above machine learning unit, the transmission circuit, the shared memory, and various types of interfaces may all be implemented by hardware circuits. For example, the transmission circuit may be a broadcast bus, the shared memory may be a non-volatile and/or volatile memory, including but not limited to a random access memory (RAM), a scratchpad memory, and the like, and the various types of interfaces may correspond to one or more data I/O interfaces or I/O pins.

The data processing device provided in the present disclosure may be applied to a machine learning operation, where the machine learning operation includes a neural network operation, a k-means operation, a support vector machine operation, and the like. When the above machine learning device performs a neural network computation, optionally, the above input data may include input neuron data and/or weight data, where the input neuron data and the weight data are data to be input by the machine learning device during execution of an artificial neural network operation. The above output data may include output neuron data, where the output neuron data is an intermediate result or a final result output by the machine learning device during execution of an artificial neural network operation. It should be understood that, since the weight data and the neuron data can be multiplexed, the input data in the computation process may not include both the input neuron data and the weight data but only the input neuron data or the weight data.

For example, in a neural network operation (unless specified otherwise, this embodiment is described by using only neural network operations as examples), the data processing device provided in the present disclosure may perform a one-layer neural network operation or a multi-layer neural network operation. For a multi-layer neural network, an implementation of the operation may be that, in a forward operation, after the operation of a previous layer of an artificial neural network is completed, an operation instruction of a next layer is performed by using an output neuron obtained by an operation unit as an input neuron of the next layer for operation (or some operations are performed on the output neuron before the output neuron serves as the input neuron of the next layer), and at the same time, a weight is replaced with a weight of the next layer; in a backward operation, after the back operation of a previous layer of the artificial neural network is completed, an operation instruction of a next layer is performed by using an input neuron gradient obtained by an operation unit as an output neuron gradient of the next layer (or as output neuron data) for operation (or some operations are performed on the input neuron gradient before the input neuron gradient serves as the output neuron gradient of the next layer), and at the same time, a weight is replaced with a weight of the next layer.

Referring to FIG. 1, in an implementation, the above machine learning device 11 may include a plurality of machine learning units 15. For a multi-layer neural network operation, an operation of a certain layer of neural network in a forward operation is described below as an example. In an embodiment, the above machine learning device may perform a computation in parallel on output neuron data of all neurons in the layer of the neural network through a plurality of machine learning units (MLU). For example, if the machine learning device includes 4 machine learning units and the layer of neural network has 100 neurons, 25 neurons may be assigned to each machine learning unit for processing by setting a corresponding operation instruction; in this process, each machine learning unit may obtain input neuron data and weight data corresponding to the 25 assigned neurons of the layer from the shared memory through the transmission circuit, perform an operation to obtain output neuron data of the 25 assigned neurons of the layer, and then transfer the output neuron data of the 25 assigned neurons of the layer to the shared memory through the transmission circuit for storage. It can be understood that each of the above machine learning units may process a plurality of assigned neuron data of the layer by parallel computations. The above computation manner of performing a neural network computation in parallel layer by layer may realize parallel processing of neural network computation, which improves the processing efficiency.

In another embodiment, the above machine learning device may perform a computation on output neuron data of all neurons in each layer of the neural network respectively in a certain order through a plurality of machine learning units. In this process, a previous machine learning unit can transfer the output neuron data of all neurons of this layer to the shared memory through the transmission circuit for storage, so that a next machine learning unit can fetch and use the output neuron data of all neurons of the layer as input neuron data of the next layer for computation. It may be understood that the above application is suitable for a scenario where a neural network computation amount of each layer is not large, such as a computation of a neural network with a small amount of neurons of each layer.

Figure 2:
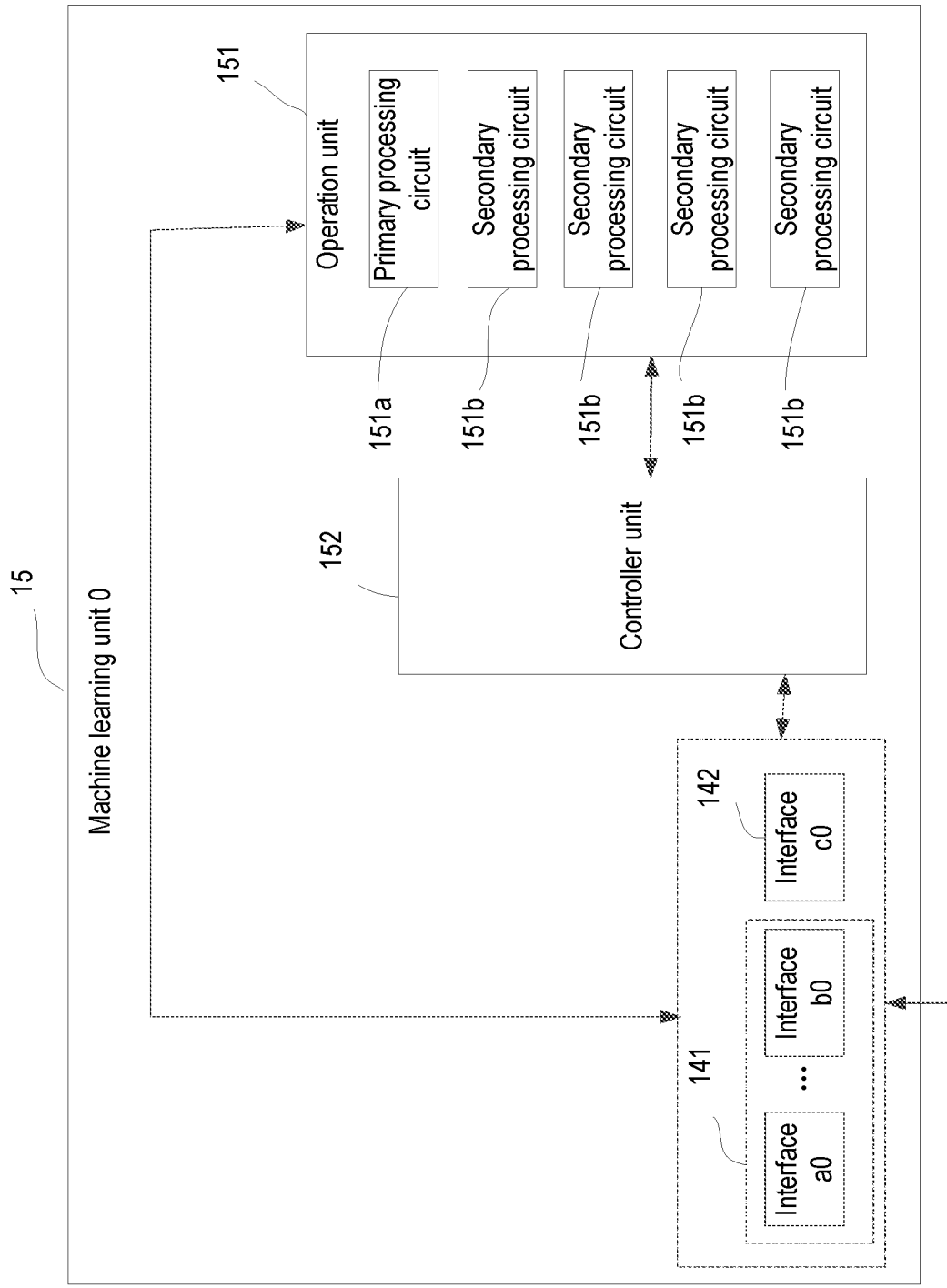
FIG. 2 is a schematic structural diagram of a machine learning unit according to an embodiment.

Referring to FIG. 2, the machine learning unit will be specifically described below by using a machine learning unit 0 in FIG. 1 as an example. In an embodiment, the machine learning unit 15 may include: a sending interface 141, a shared data receiving interface 142, at least one operation unit 151, and a controller unit connected to the operation unit 151. The operation unit 151 includes a primary processing circuit 151a and a plurality of secondary processing circuits 151b, and the operation unit 151 is connected to the transmission circuit 12 through the sending interface 141 and the shared data receiving interface 142.

The controller unit 152 is configured to send the data operation signal and the output neuron data to the transmission circuit 12 through the sending interface 141, receive the input neuron data and the weight data obtained by the transmission circuit 12 from the shared memory 13 through the shared data receiving interface 142, and send the input neuron data and the weight data to the primary processing circuit 151a and/or the secondary processing circuits 151b.

The primary processing circuit 151b is configured to distribute the input neuron data and/or the weight data to the plurality of secondary processing circuits 151b; the plurality of secondary processing circuits 151b are configured to perform intermediate operations in parallel according to neuron data and weight data to obtain a plurality of intermediate results, and send the plurality of intermediate results to the primary processing circuit 151a; and the primary processing circuit 151a is further configured to perform subsequent processing on the plurality of intermediate results to obtain a computation result. The subsequent processing may include an activation operation. Specifically, the controller unit 152 may obtain a computation instruction, parse the computation instruction to obtain a plurality of operation instructions, and send the plurality of operation instructions to the primary processing circuit. It may be understood that, in this embodiment, when the machine learning unit includes a plurality of operation units, each operation unit may share the above sending interface and the above shared data receiving interface.

For example, in an optional embodiment, the primary processing circuit may further include a controller unit, where the controller unit may include a primary instruction processing unit configured to decode an operation instruction into a micro-instruction. In another optional embodiment, the secondary processing circuit may also include a controller unit, where the controller unit may include a secondary instruction processing unit configured to receive and process a micro-instruction. The above micro-instruction may be a next-level instruction of the instruction. The micro-instruction may be obtained by splitting or decoding the instruction, and may be further decoded into a control signal for various components, units, or processing circuits. For example, a product micro-instruction is a next-level instruction of a convolution instruction.

A neural network operation process of the machine learning unit will be described in detail below by using a structure of the above machine learning unit as an example. The process includes the following steps S101-S106:

the step S101, pre-storing an IO instruction in a starting address of an instruction storage unit of the controller unit;

the step S102, reading, by the controller unit, the IO instruction from the starting address of the instruction storage unit, obtaining a neural network operation instruction corresponding to the machine learning unit from an off-chip memory through an off-chip interface according to a control signal obtained from decoding the IO instruction, or obtaining a neural network computation instruction corresponding to the machine learning unit from a shared memory through the transmission circuit, and storing an obtained computation instruction in the instruction storage unit;

the step S103, reading, by the controller unit, a next IO instruction from the instruction storage unit, and according to a control signal obtained from decoding by the IO instruction, reading all data blocks (such as assigned input neuron data and weight data of neurons of the layer, an interpolation table for a quick activation function operation, a constant table for configuring parameters of the operation device, bias data, etc.) required by the operation unit from the shared memory through the transmission circuit; the data operation signal includes a source address of the above data blocks in the shared memory;

the step S104, reading, by the controller unit, a next CONFIG (configuration) instruction from the instruction storage unit, and according to a control signal obtained from decoding by the CONFIG instruction, configuring various constants required by the computation of the neural network layer, such as configuring, by the operation unit, a value of an internal register of the operation unit according to a constant required by the activation function;

the step S105, reading, by the controller unit, a next COMPUTE (computation) instruction from the instruction storage unit, and according to a control signal (operation instruction) obtained from decoding by the COMPUTE instruction, sending, by the operation unit, assigned input neuron data, weight data, and operation instruction of the neurons of the layer to the primary processing circuit, determining, by the primary processing circuit, the assigned input neuron data of the neurons of the layer to be broadcast data and determining the weight data to be distribution data, distributing one piece of distributed data into a plurality of data blocks, sending at least one of the data blocks, broadcast data, and at least one of a plurality of operation instructions to the secondary processing circuits, obtaining, by the secondary processing circuits, an intermediate result from a multiplication processing circuit, an accumulation processing circuit, etc., and obtaining, by the primary processing circuit, assigned neuron data output by the neurons of this layer according to the intermediate result and the activation processing circuit; and the step S106, reading, by the controller unit, a next IO instruction from the instruction storage unit, and according to the data operation signal obtained from decoding by the IO instruction, transferring the output neuron data to the shared memory for storage through the transmission circuit to obtain input neuron data of part of neurons of the next layer; and the above data operation signal includes a destination address of the above output neuron data in the shared memory.

The step S105 is described below with examples. For example, in a fully connected operation of neural network operations, a neural network operation process may be: $y=f(wx+b)$, where x is an input neuron matrix, w is a weight matrix, b is a bias scalar, f is an activation function which may be any of sigmoid, tanh, relu, and softmax function. For example, if there is a binary tree relationship (a tree-type relationship) between the primary processing circuit and the secondary processing circuits, and the operation unit has a primary processing circuit and 8 secondary processing circuits, then an implementation method of the above step S105 may be: obtaining, by the controller unit, an input neuron matrix x, a weight matrix w, and a fully connected operation instruction from the shared memory, and sending the input neuron matrix x, the weight matrix w, and the fully connected operation instruction to the primary processing circuit; determining, by the primary processing circuit, the input neuron matrix x and the weight matrix w to be broadcast data and distribution data respectively, splitting, by the primary processing circuit, the weight matrix w into 8 sub-matrices, distributing the 8 sub-matrices to the 8 secondary processing circuits through the tree module, and broadcasting the input neuron matrix x to the 8 secondary processing circuits; performing, by the secondary processing circuits, multiplication and accumulation operations on the 8 sub-matrices and the input neuron matrix x in parallel to obtain 8 intermediate results, and sending the 8 intermediate results to the primary processing circuit; and sorting, by the primary processing circuit, the 8 intermediate results to obtain an operation result of wx, and performing an operation of offset b and then an activation operation on the operation result to obtain a final result y.

It can be understood that since each of the above machine learning units can perform a computation in parallel on each assigned neuron of a certain layer, the shared memory can store the output neuron data of all neurons of each layer and the input neuron data required by all the neurons of the next layer, while the weight data may be multiplexed, or weight data of a new neural network layer may be obtained from the shared memory.

It should be noted that each machine learning unit may include one or a plurality of operation units, and the structure of each operation unit may be identical or different. The structure of each operation unit is embodied in a relationship between the primary processing circuit and the respective secondary processing circuits, including but not limited to a tree-type relationship, an H-type relationship, and a systolic array-type relationship. The technical solutions provided in the present disclosure sets the operation unit into a single-master-multiple-slave structure and may split data according to a computation instruction of a forward operation. In this way, a plurality of secondary processing circuits may perform operations on the parts with large computation amount in parallel, which may increase the operation speed, save operation time, and reduce power consumption.

The data processing device shown in FIG. 1 in this embodiment is further described below. A unicast read operation is a read operation in a unicast mode, and a corresponding data operation signal may be: a unicast read instruction, and a unicast read request. A data operation signal corresponding to a broadcast operation may be: a broadcast instruction, a multicast instruction, a broadcast request, and a multicast request. For example, a unicast read instruction is a read instruction in a unicast mode, which may be a read instruction sent by a certain machine learning unit to read input neuron data and weight data in the source address of the shared memory; the input neuron data and the weight data need to be returned to the above machine learning unit, where the input neuron data and the weight data are required by the assigned neuron during a process of the machine learning unit performing a computation on assigned neurons of a certain layer according to a computation instruction. Similarly, a unicast read request is a read request in the unicast mode. A broadcast instruction is a read instruction sent by a machine learning unit to read input neuron data and weight data in the source address of the shared memory. The input neuron data and the weight data are returned to all the machine learning units in the above machine learning device, where the input neuron data may be input neuron data required by all neurons of a certain layer (all output neuron data of a previous layer) and the weight data may be multiplexed weight data such as a convolution kernel. A difference between a multicast instruction and a broadcast instruction is that data return objects of the multicast instruction are a plurality of machine learning units corresponding to a flag field in the multicast instruction instead of all machine learning units in the above machine learning device. In addition, generally a difference between an instruction and a request is that an instruction has relatively large execution overhead, but includes more information, while a request has relatively small execution overhead, but includes less information.

Generally, a machine learning unit needs at least two corresponding data interfaces when receiving data returned by a unicast read operation and a broadcast operation, where the two interfaces are used to receive unicast read data returned by the transmission circuit for a unicast read data operation signal, and receive broadcast and/or multicast data returned by the transmission circuit for a broadcast and/or multicast data operation signal, respectively. In this embodiment, as shown in FIG. 1, a machine learning unit 0 only has one receiving interface which may be a shared data receiving interface such as an interface c0. The interface is used to receive unicast read data returned by the transmission circuit for a unicast read data operation signal, and receive broadcast and/or multicast data returned by the transmission circuit for a broadcast and/or multicast data operation signal.

It can be understood that, if there is a cache, the transmission circuit may temporarily store required input neuron data and weight data fetched from the shared memory in the cache, then determine a request source of the data, which, in other words, is a data return object (machine learning unit) corresponding to a data operation signal associated with the data, and send the data to the shared data receiving interface; during the unicast read operation, the above shared data receiving interface is a shared data receiving interface of a machine learning unit corresponding to the data return object; during the broadcast operation, the shared data receiving interface includes a plurality of shared data receiving interfaces of a plurality of machine learning units corresponding to the data return object.

Therefore, in the data processing device shown in this embodiment, at least one machine learning unit shares one data receiving interface in the machine learning unit when performing a unicast read operation and a broadcast operation, which may further save the count of returned data interfaces in the machine learning unit, save hardware resources, and reduce hardware area and power consumption.

Figure 3:
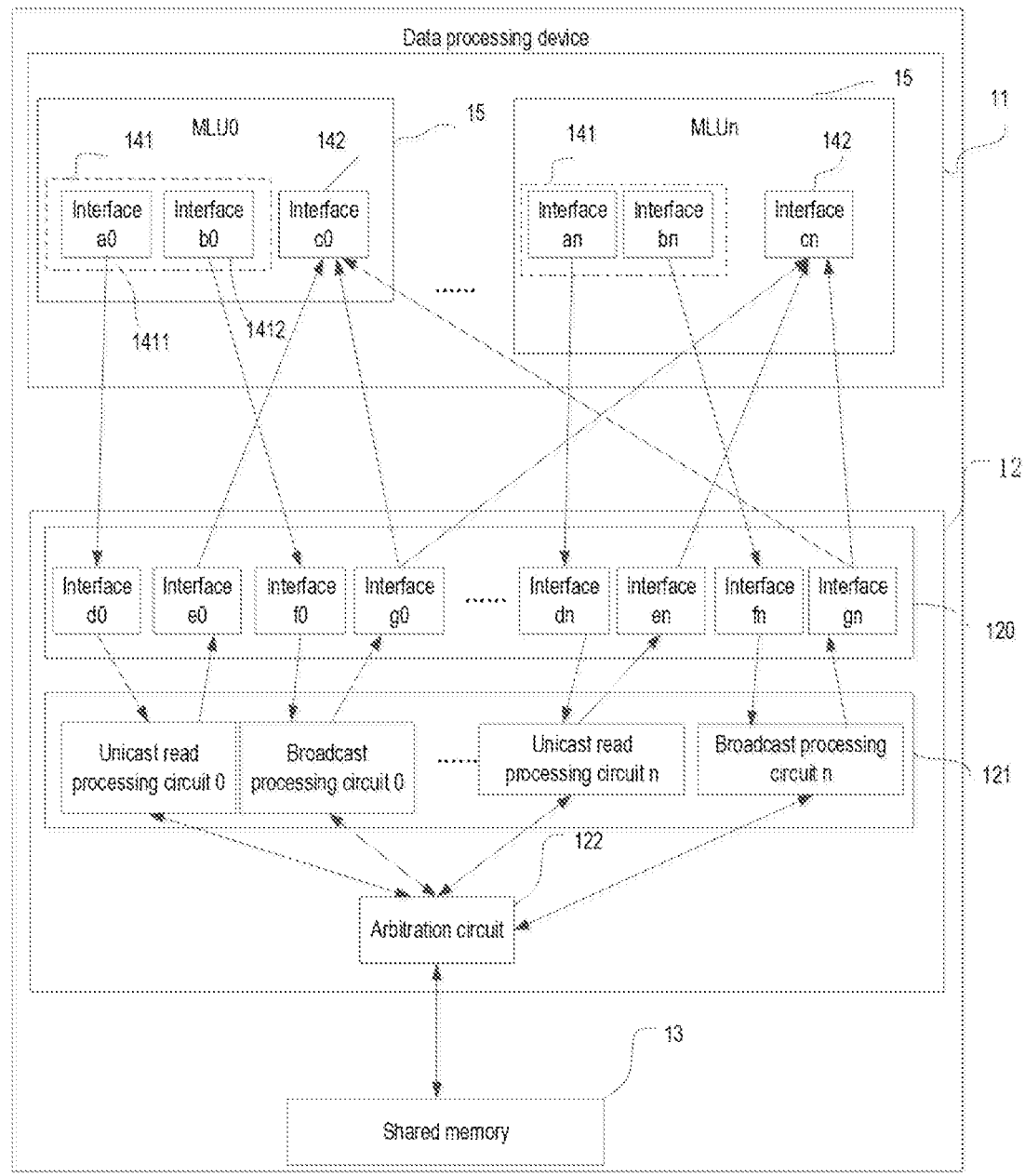
FIG. 3 is a schematic structural diagram of a data processing device according to an embodiment.

The sending interface of the machine learning unit is described in detail below. Referring to FIG. 3, on the basis of FIG. 1, the sending interface 141 includes: a unicast read signal sending interface 1411 and a broadcast signal sending interface 1412; the machine learning unit 15 implements a unicast read operation through a connection between the unicast read signal sending interface 1411 and the transmission circuit 12 as well as a connection between the shared data receiving interface 142 and the transmission circuit 12, and implements a broadcast operation through a connection between the broadcast signal sending interface and the transmission circuit as well as a connection between the shared data receiving interface 142 and the transmission circuit 12. For an MLU0, a unicast read signal transmission interface corresponds to an interface a0, a broadcast signal transmission interface corresponds to an interface b0, and a shared data receiving interface corresponds to an interface c0. The interface a0 may be used to send a unicast read data operation signal to the transmission circuit, the interface b0 may be used to send a broadcast and/or multicast data operation signal to the transmission circuit, and the interface c0 may be used to receive unicast read data returned by the transmission circuit for the unicast read data operation signal, and receive broadcast and/or multicast data returned by the transmission circuit for the broadcast and/or multicast data operation signal. Therefore, in this embodiment, different types of data operations may be sent through the unicast read signal sending interface and the broadcast signal sending interface, which simplifies the processing logic.

In an embodiment, corresponding to the above unicast read operation and broadcast operation, as shown in FIG. 3, the transmission circuit 12 in the above data processing device may include: a second transmission interface 120, a read/write processing circuit 121 connected to the second transmission interface 120, and an arbitration circuit 122 connected to the read/write processing circuit 121; the read/write processing circuit 121 is configured to receive a data operation signal sent by the at least one machine learning unit 15 through the transmission interface 141 and the second transmission interface 120, send the data operation signal to the arbitration circuit 122, and return the data obtained by the arbitration circuit 122 from the shared memory 13 to the machine learning unit corresponding to the data operation signal through the second transmission interface 120 and the shared data receiving interface 142; and the arbitration circuit 122 is configured to arbitrate the data operation signal received from the read/write processing circuit 121 according to a preset arbitration rule, and operate the data in the shared memory 13 according to the data operation signal that has been successfully arbitrated.

Specifically, the read/write processing circuit 121 may process a unicast read signal, a broadcast signal, and/or a multicast signal. In an embodiment, the read/write processing circuit 121 may include: a unicast read processing circuit configured to process a unicast read signal, a broadcast signal, and/or a multicast signal. When the unicast read processing circuit processes the broadcast signal and/or the multicast signal, the processing circuit may receive the broadcast and/or multicast signal sent by at least one machine learning unit through the broadcast signal sending interface and the second transmission interface, send the broadcast and/or multicast signal to the arbitration circuit, and transfer data obtained by the arbitration circuit from the shared memory to a plurality of machine learning units corresponding to the broadcast and/or multicast signal through the second transmission interface and the shared data receiving interface in a preset order. The preset order is an order of returning data to the plurality of machine learning units, which can be arranged according to priorities of the plurality of machine learning units, serial numbers of the plurality of machine learning units, and the like.

Optionally, the read/write processing circuit 121 may include: a unicast read processing circuit and a broadcast processing circuit, where the unicast read processing circuit is configured to process a unicast read signal, and the broadcast processing circuit is configured to process a broadcast signal and/or a multicast signal.

The unicast read processing circuit may be configured to receive a unicast read signal sent by at least one machine learning unit through the unicast read signal sending interface and the second transmission interface, send the unicast read signal to the arbitration circuit, and transfer data obtained by the arbitration circuit from the shared memory to a machine learning unit corresponding to the unicast read signal through the second transmission interface and the shared data receiving interface; the broadcast read processing circuit may be configured to receive a broadcast and/or multicast signal signal sent by at least one machine learning unit through the broadcast signal sending interface and the second transmission interface, send the broadcast and/or multicast signal to the arbitration circuit, and transfer data obtained by the arbitration circuit from the shared memory to a plurality of machine learning units corresponding to the broadcast and/or multicast signal through the second transmission interface and the shared data receiving interface.

The preset arbitration rule may be used to allow the arbitration circuit to determine priorities of a plurality of data operation signals according to a certain rule, so that the arbitration circuit may determine an object to be operated according to the priority of each data operation signal, which is to select a data operation signal with a high priority to be a data operation signal that has been successfully arbitrated; for example, a priority of a data operation signal with a large transmission rate may be set to a high priority, while a priority of a data operation signal with a small transmission rate may be set to a low priority; for another example, the above preset arbitration rule may be a round-robin scheduling arbitration rule, a maximum carrier-to interference scheduling rule, a proportional fairness rule, and the like. In addition, the arbitration circuit may also use whether a data path (interface to interface) between the machine learning unit and the read/write processing circuit is idle as an auxiliary arbitration rule, in other words, a data path corresponding to a data operation signal that has been successful arbitrated is idle.

Specifically, the unicast read processing circuit may be connected to a plurality of machine learning units through the second transmission interface to perform unicast read operations of the plurality of machine learning units. The unicast read processing circuit may cache a plurality of unicast read instructions in the unicast read instruction cache queue of the unicast read processing circuit, parse the unicast read instructions to obtain corresponding unicast read instructions, and cache the corresponding unicast read instructions in the unicast read request cache queue of the unicast read processing circuit to be arbitrated by the arbitration circuit. A unicast read request can be directly cached in the unicast read request cache queue without a parsing operation. Similarly, the broadcast processing circuit may also be connected to a plurality of machine learning units through the second transmission interface, and may include a broadcast and/or multicast instruction cache queue and a broadcast and/or multicast request cache queue, which will not be further described herein. In an optional embodiment, the read/write processing circuit may include a unicast read processing circuit and a broadcast processing circuit.

Therefore, in this embodiment, the unicast read processing circuit can be used to process the unicast read operation, the broadcast processing circuit can be used to process the broadcast operation, and different types of data operations can be performed through different processing circuits, which simplify the processing logic.

In an embodiment, as shown in FIG. 3, on the basis of the data processing device in FIG. 1, the second transmission interface may be divided into interfaces that process different types of data operations. Specifically, the second transmission interface may include: at least one cluster of unicast read signal receiving interfaces and unicast read data sending interfaces that are connected to the unicast read processing circuit, and at least one cluster of broadcast signal receiving interfaces and broadcast data sending interfaces that are connected to the broadcast processing circuit, where the unicast read signal receiving interfaces are connected to the unicast read signal sending interfaces of the machine learning unit, the broadcast signal receiving interfaces are connected to the broadcast signal sending interfaces of the machine learning unit, and the unicast read data sending interfaces and the broadcast data sending interfaces in the transmission circuit are respectively connected to the shared data receiving interface of the machine learning unit. In this embodiment, different types of data operations may be implemented respectively through each interface in the second transmission interface, which simplifies the processing logic.

In an embodiment, as shown in FIG. 3, the read/write processing circuit may be divided into a plurality of processing circuit clusters, where one machine learning unit corresponds to one processing circuit cluster, and the processing circuit cluster at least includes a unicast read processing circuit and a broadcast processing circuit. For example, MLU0 corresponds to a unicast read processing circuit 0 and a broadcast processing circuit 0, and MLUn corresponds to a unicast read processing circuit n and a broadcast processing circuit n. Similarly, the second transmission interface includes a group of interfaces connected to a processing circuit cluster and a machine learning unit respectively, where the interfaces are respectively used to realize a one-to-one connection between the machine learning unit and the unicast read processing circuit as well as a one-to-one connection between the machine learning unit and the broadcast processing circuit.

For example, for MLU0 and a unicast read processing circuit 0, an interface d0 in the second transmission interface is used as a unicast read signal receiving interface to be connected to a unicast read signal sending interface a0 and a unicast read processing circuit 0 of MLU0, respectively, and may be used to receive a unicast read signal sent from MLU0 and send the signal to the unicast read processing circuit 0 for processing; an interface e0 in the second transmission interface is used as a unicast read data transmission interface to be connected to a shared data receiving interface c0 and a unicast read processing circuit of MLU0, respectively, and may be used to receive input neuron data and weight data corresponding to the unicast read signal sent by the unicast read processing circuit 0 and transfer the above data to the interface c0 in MLU0. For MLU0 and a broadcast processing circuit 0, an interface f0 in the second transmission interface is used as a broadcast signal receiving interface to be connected to a broadcast signal sending interface b0 and a broadcast processing circuit 0 of MLU0, respectively, and may be used to receive a broadcast and/or multicast signal sent from MLU0 and send the signal to the unicast read processing circuit 0 for processing; an interface g0 in the second transmission interface is used as a broadcast data sending interface to be connected to a shared data receiving interface ci and the broadcast processing circuit 0 of a plurality of MLUs, respectively, and may be used to receive input neuron data and weight data corresponding to the broadcast and/or multicast signal sent by the broadcast processing circuit 0 and transfer the above data to the shared data receiving interface ci in the plurality of MLUs.

Therefore, in this embodiment, the one-to-one connection between the machine learning unit and the unicast read processing circuit as well as the one-to-one connection between the machine learning unit and the broadcast processing circuit may achieve targeted one-to-one data operation processing, which may reduce the complexity of the access logic of data operations, reduce conflicts, and improve the processing efficiency.

Figure 4:
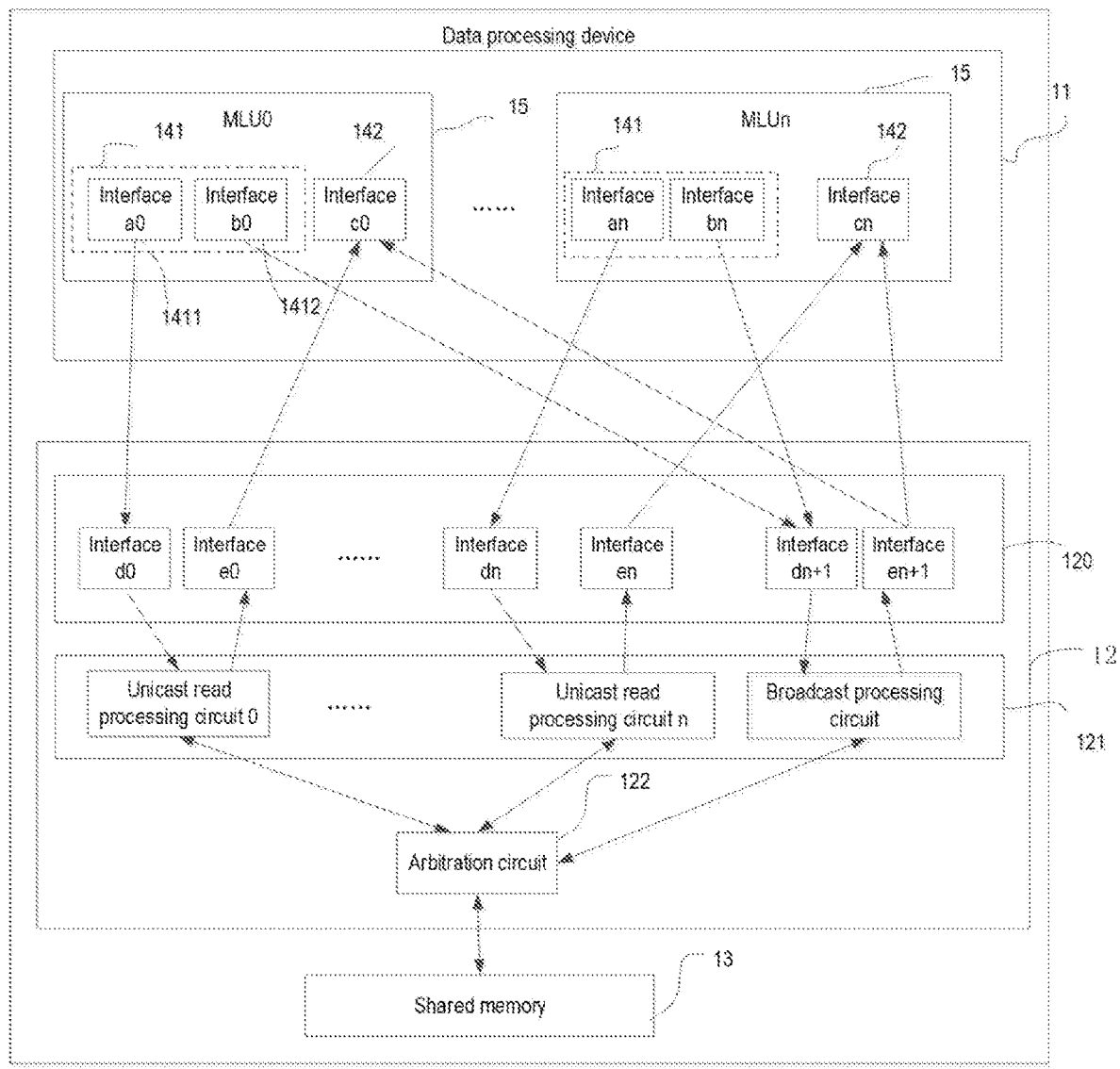
FIG. 4 is a schematic structural diagram of a data processing device according to an embodiment.

As shown in FIG. 4, in an optional embodiment, a count of interfaces in the transmission circuit is reduced on the basis of the data processing device in FIG. 3. Specifically, the read/write processing circuit 121 may include: a broadcast processing circuit and a plurality of unicast read processing circuits, where the plurality of unicast read processing circuits and the plurality of machine learning units are connected one to one, and the broadcast processing circuit and the plurality of machine learning units are connected one-to-many. For example, MLU0 corresponds to a unicast read processing circuit 0 and the broadcast processing circuit, and MLUn corresponds to a unicast read processing circuit and the broadcast processing circuit. Similarly, the second transmission interface includes a group of interfaces connected to a unicast read processing circuit cluster and a machine learning unit respectively, where the interfaces are used to realize a one-to-one connection between the machine learning unit and the unicast read processing circuit; the second transmission interface further includes a group of interfaces connected to a broadcast processing circuit and a plurality of machine learning units respectively, where the interfaces are used to realize a many-to-one connection between the machine learning units and the broadcast processing circuit. Specifically, the second transmission interface may include: a group of broadcast interfaces connected to the broadcast processing circuit, where the above broadcast interfaces may include: a broadcast signal receiving interface and a broadcast data sending interface; and the plurality of machine learning units are connected to the broadcast processing circuit through the set of broadcast interfaces.

For example, for a plurality of MLUs and the broadcast processing circuit, an interface dn+1 in the second transmission interface may be used as a broadcast signal receiving interface to receive broadcast and/or multicast signals sent from the plurality of MLUs and send the signals to the broadcast processing circuit for processing; an interface en+1 in the second transmission interface may be used as a broadcast data sending interface to receive input neuron data and weight data corresponding to the broadcast and/or multicast signal sent by the broadcast processing circuit and transfer the above data to shared data receiving interfaces in the plurality of MLUs.

It can be seen that a plurality of machine learning units may share a same broadcast processing circuit and a same group of broadcast signal receiving interfaces and broadcast data receiving interfaces. Therefore, the data processing device in this embodiment not only reduces the count of returned data interfaces in the machine learning unit, but further reduces the count of interfaces in the transmission circuit, saves hardware resources, and reduces hardware area and power consumption.

Figure 5:
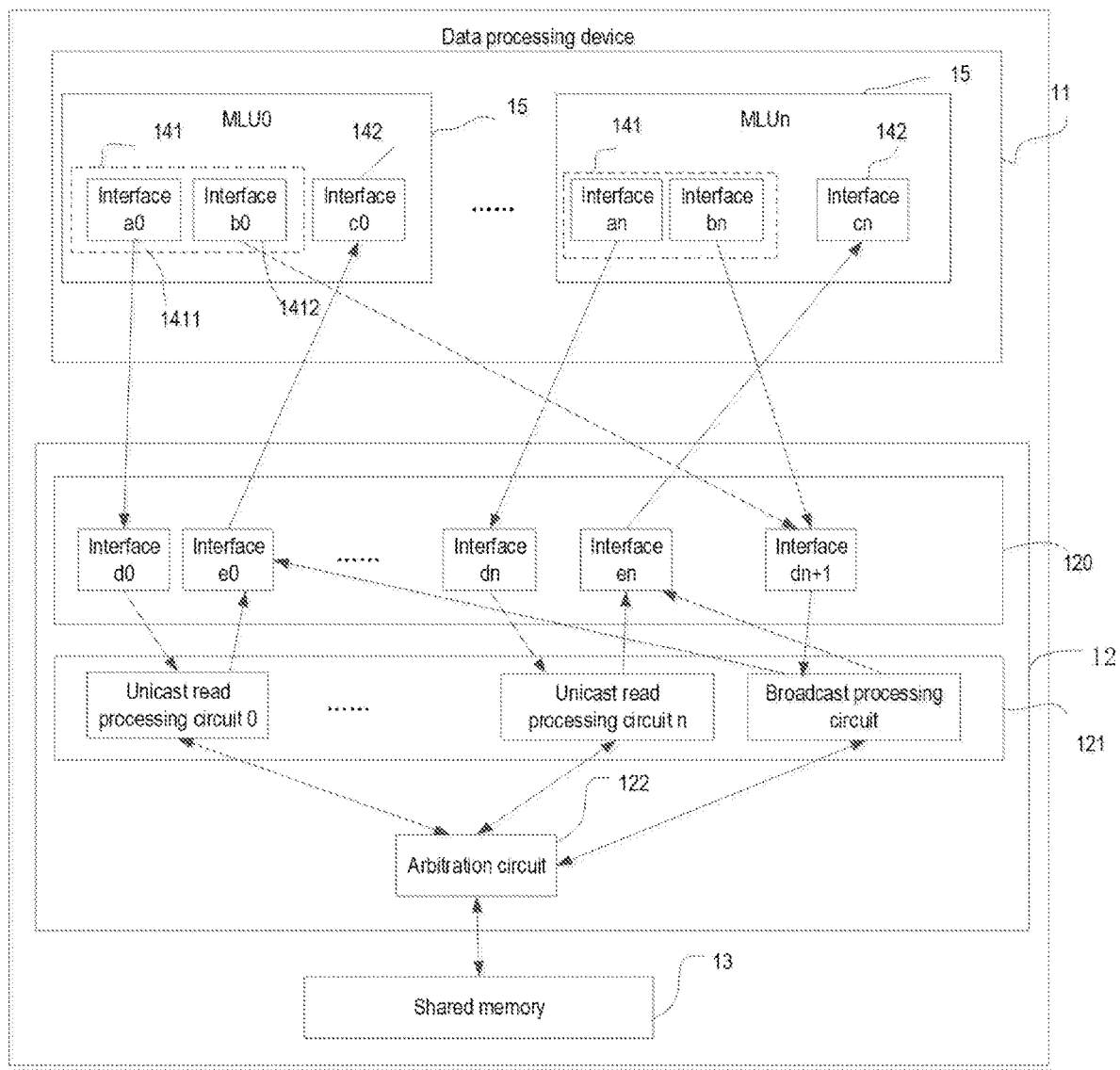
FIG. 5 is a schematic structural diagram of a data processing device according to an embodiment.

As shown in FIG. 5, in an optional embodiment, the count of interfaces in the transmission circuit is further reduced on the basis of FIG. 4. Specifically, the second transmission interface 120 may include: at least one cluster of unicast read signal receiving interfaces and unicast read data sending interfaces that are connected to the unicast read processing circuit, and at least one cluster of broadcast signal receiving interfaces and broadcast data sending interfaces that are connected to the broadcast processing circuit, where the unicast read signal receiving interfaces are connected to the unicast read signal sending interfaces of the machine learning unit, the broadcast signal receiving interfaces are connected to the broadcast signal sending interfaces of the machine learning unit, and the unicast read data sending interfaces and the broadcast data sending interfaces in the transmission circuit are respectively connected to the shared data receiving interface of the machine learning unit.

For example, for a unicast read processing circuit 0, the second transmission interface includes a cluster of unicast read signal receiving interfaces d0 and shared data sending interfaces e0 connected to the unicast read processing circuit 0 in a one-to-one manner, the unicast read signal receiving interface d0 is connected to the unicast read signal sending interface a0 in MLU0, and the shared data sending interface e0 is connected to the shared data receiving interface c0 in MLU0; for a unicast reading processing circuit n, the second transmission interface includes a group of unicast read signal receiving interfaces dn and shared data sending interfaces en connected to the unicast reading processing circuit n in a one-to one manner, the unicast read signal receiving interface dn is connected to the unicast read signal sending interface an in MLUn, and the shared data sending interface en is connected to the shared data receiving interface cn in MLUn; the second transmission interface may further include a broadcast signal receiving interface dn+1 connected to the broadcast processing circuit, where the broadcast signal receiving interface dn+1 is connected to the broadcast signal sending interface of each MLU (for MLUi, the broadcast signal sending interface is an interface bi) respectively; in addition, it should be noted that each shared data sending interface ei in the transmission circuit is connected to the broadcast processing circuit, and may receive input neuron data and weight data corresponding to a broadcast and/or multicast signal sent by the broadcast processing circuit and transfer the above data to the shared data receiving interfaces ci in the plurality of MLUs. It can be seen that, in the transmission circuit, each unicast read processing circuit i shares the same shared data sending interface ei with the broadcast processing circuit, and a data path composed of the shared data receiving interface ci in MLUi and the shared data sending interface ei in the transmission circuit may implement transfer of unicast read data and broadcast and/or multicast data between MLUi and the transmission circuit.

It can be seen that a plurality of unicast read processing circuits respectively share a same data sending interface with the broadcast processing circuit. Therefore, the data processing device in this embodiment further reduces the count of interfaces in the transmission circuit, saves hardware resources, and reduces hardware area and power consumption.

The present disclosure further provides a neural network operation device which includes one or more computation devices mentioned in the present disclosure. The neural network operation device is configured to obtain data to be operated and control information from other processing devices, perform a specified neural network operation, and send an execution result to a peripheral apparatus through an I/O interface. The peripheral apparatus may include a camera, a monitor, a mouse, a keyboard, a network card, a WIFI interface, a server, and the like. When more than one of the above computation devices are included, the computation devices may be interconnected and transfer data to each other through a specific structure. For example, the computation devices may be interconnected and transfer data via a PCIE bus to support neural network operations with a larger scale. In this case, the computation devices may share the same control system, or may have separate control systems. The computation devices may share a memory, or each accelerator may have separate memories. In addition, an interconnection method of the computation devices may be any interconnection topology.

The neural network operation device has good compatibility and may be connected to various types of servers through a PCIE interface.

Figure 6:
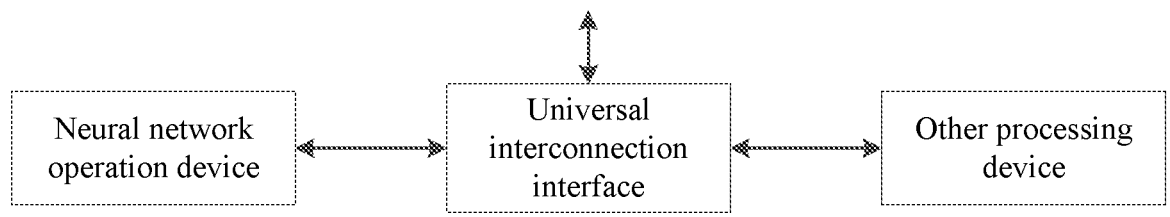
FIG. 6 is a schematic structural diagram of a combined processing device according to an embodiment.

The present disclosure also provides a combined processing device, where the device includes the neural network operation device, a universal interconnection interface, and other processing devices. The neural network operation device interacts with other processing devices to perform operations specified by users. FIG. 6 is a schematic diagram of the combined processing device.

The other processing devices include at least one or more of a general-purpose/special-purpose processors such as a central processing unit (CPU), a graphics processing unit (GPU), a neural network processor, and the like. A count of processors included in the other processing devices is not limited herein. The other processing devices may serve as an interface that connects the neural network operation device to external data and control, including data moving, and may perform the basic control such as starting and stopping the neural network operation device. The other processing devices may also cooperate with the neural network operation device to complete operation tasks.

The universal interconnection interface may be configured to transfer data and control instructions between the neural network operation device and the other processing devices. The neural network operation device may obtain required input data from the other processing devices and write the data in an on-chip storage device of the neural network operation device. The neural network operation device may obtain control instructions from the other processing device, and write the control instructions in an on-chip control cache of the neural network operation device. The neural network operation device may further read data stored in a storage module of the neural network operation device and transfer the data to the other processing devices.

Figure 7:
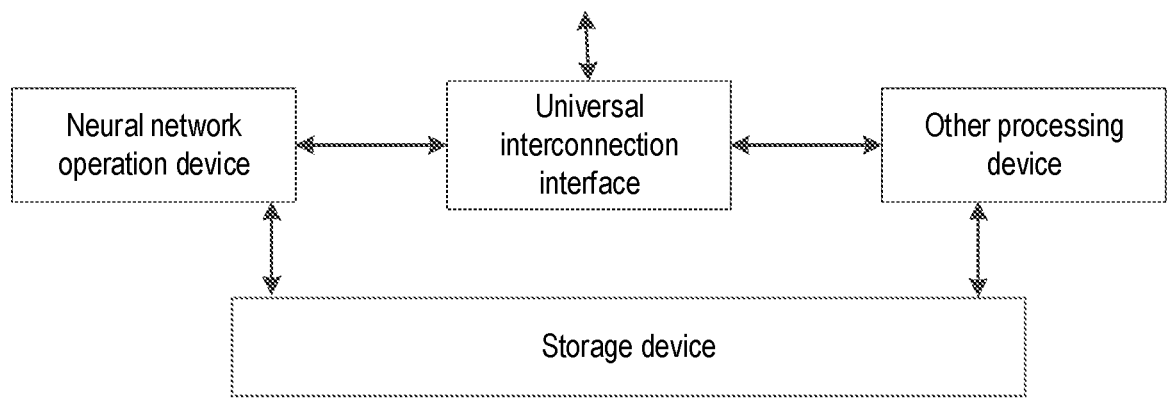
FIG. 7 is a schematic structural diagram of a combined processing device according to another embodiment.

Optionally, as shown in FIG. 7, the structure may further include a storage device, where the storage device is connected to the neural network operation device and the other processing devices respectively, and the storage device is configured to store data of the neural network computation device and the other processing devices. The storage device is configured to store data of the neural network operation device and the other processing devices, and is particularly suitable for a case where data to be operated cannot be completely stored in an internal memory of the neural network operation device or the other processing devices.

The combined processing device may be used as an SOC (System on Chip) of a device such as a mobile phone, a robot, a drone, a video surveillance device, and the like, which may effectively reduce the core area of a control part, increase the processing speed, and reduce the overall power consumption. In this case, a universal interconnection interface of the combined processing device may be connected to some components of the device. The components may include a camera, a monitor, a mouse, a keyboard, a network card, and a WIFI interface.

In some embodiments, the present disclosure provides a chip which includes the above neural network computation device or the combined processing device.

In some embodiments, the present disclosure provides a chip package structure which includes the above chip.

Figure 8:
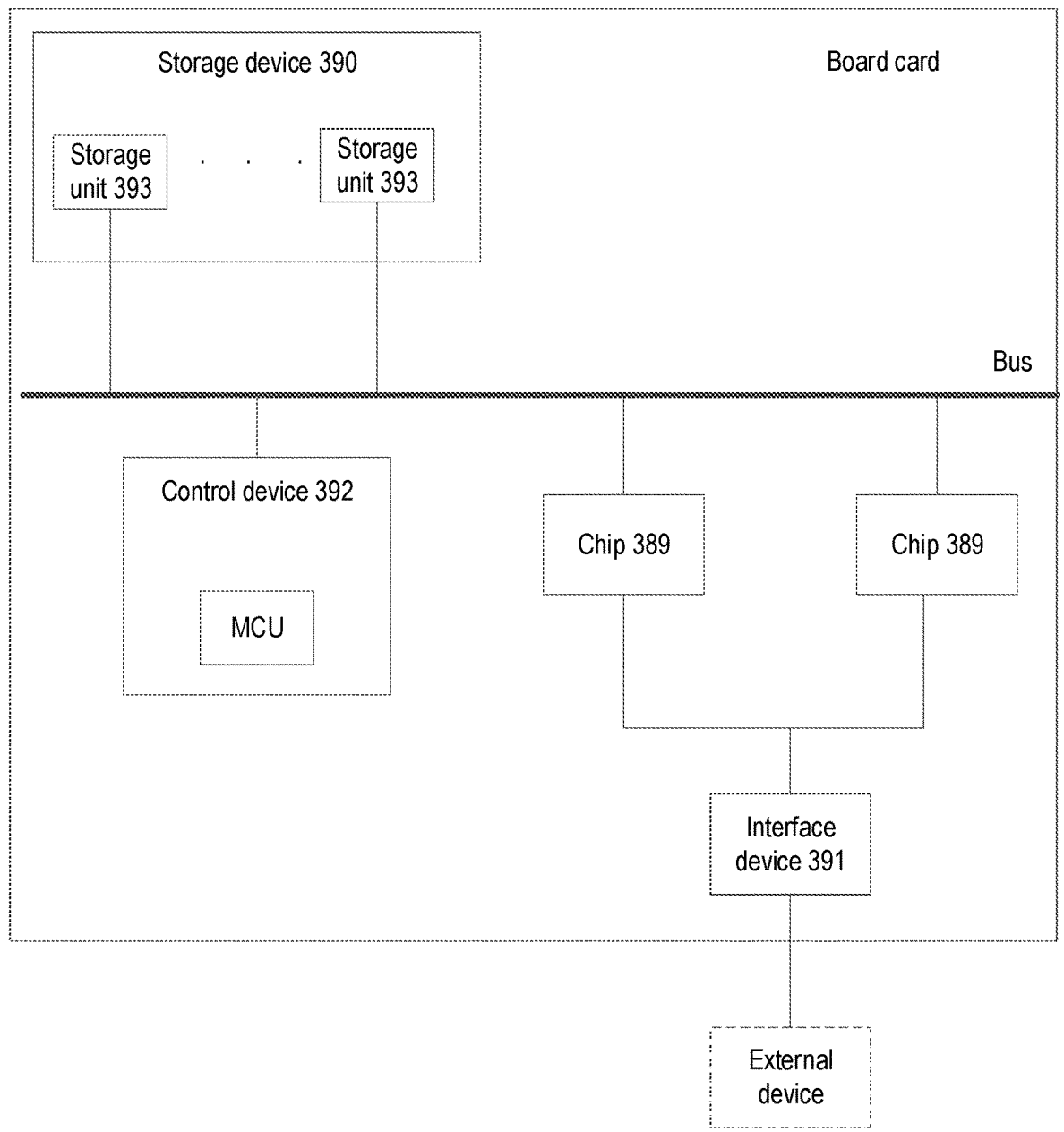
FIG. 8 is a schematic structural diagram of a board card according to an embodiment.

In some embodiments, the present disclosure provides a board card which includes the above chip package structure. FIG. 8 shows a board card which includes the above chip 389 and other supporting components, where the supporting components include and are not limited to: a storage device 390, an interface device 391, and a control device 392;

the storage device 390 is connected to the chip in the chip package structure through a bus for storing data. The storage device may include a plurality of clusters of storage units 393. Each cluster of the storage units is connected to the chip through a bus. It may be understood that each cluster of the storage units may be DDR SDRAMs (Double Data Rate Synchronous Dynamic Random Access Memory).

DDR may double the speed of SDRAM without increasing a clock frequency. DDR allows data to be read on rising and falling edges of a clock pulse. A speed of DDR is twice that of standard SDRAM. In an embodiment, the storage device may include four clusters of the storage units. Each cluster of the storage units may include a plurality of DDR4 particles (chips). In an embodiment, the chip may include four 72-bit DDR4 controllers, where 64 bits in the 72-bit DDR4 controller are used for data transfer and 8 bits are used for ECC verification. It may be understood that when DDR4-31200 particles are used in each cluster of the storage units, a theoretical bandwidth of data transfer may reach 251600 MB/s.

In an embodiment, each cluster of the storage units includes a plurality of DDR SDRAMs arranged in parallel. DDR may transfer data twice in one clock cycle. A controller for controlling the DDR is arranged in the chip to control data transfer and data storage of each storage unit.

The interface device is electrically connected to the chip in the chip package structure. The interface device is configured to implement data transfer between the chip and an external device (such as a server or a computer). For example, in an embodiment, the interface device may be a standard PCIE interface. For example, data to be processed is transferred from the server to the chip through a standard PCIE interface to realize data transfer. Optionally, when a PCIE 3.0×16 interface is used for transfer, a theoretical bandwidth may reach 116000 MB/s. In another embodiment, the interface device may also be other interfaces. A specific representation of the other interfaces is not limited herein, as long as the interface unit can realize a switching function. In addition, a computation result of the chip is still sent back to the external device (such as a server) by the interface device.

The control device is electronically connected to the chip. The control device is configured to monitor a state of the chip. Specifically, the chip and the control device may be electrically connected through an SPI interface. The control device may include a micro controller unit (MCU). For example, the chip may include a plurality of processing chips, processing cores, or processing circuits, and may drive a plurality of loads. Therefore, the chip can be in different working states such as multi-load and light-load. The control device may realize regulation and control of working states of a plurality of processing chips, processing cores and/or processing circuits in the chip.

In some embodiments, the present disclosure provides an electronic device which includes the above board card.

The electronic device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

It should be understood that identical or similar parts in the above embodiments may be referred to each other, and for contents not described in detail in some embodiments, please refer to the identical or similar contents in other embodiments.

It should be noted that in the descriptions of the present disclosure, the terms "first", "second", etc., are only used for descriptive purposes, and should not be understood as indicating or implying relative importance. In addition, in the description of the present disclosure, unless otherwise specified, the word "plurality" means "at least two".

It should be understood that any process or method description in the flowchart or described in other ways herein represents one or more modules, segments, or parts of codes of executable instructions configured to implement specific logical functions or steps of the process. In addition, the scope of optional implementations of the present disclosure includes additional implementations, and the functions can be implemented in an order not shown or discussed in the present disclosure, or in a substantially simultaneous manner, or in a reverse order according to the functions involved, which should be understood by those skilled in the art to which the embodiments of this present disclosure belong.

It should be understood that each part of the present disclosure can be implemented by hardware, software, firmware, or a combination thereof. In the above implementations, a plurality of steps or methods can be implemented by using software or firmware stored in a memory and executed by a suitable instruction execution system. For example, if hardware is used for implementation, as in another implementation, the steps can be implemented by any one or more of the following technologies known in the art: a discrete logic circuit with a logic gate circuit configured to implement logic functions on data signals, an application-specific integrated circuit with a suitable combinational logic gate circuit, a programmable gate array (PGA), a field-programmable gate array (FPGA), and the like.

Those of ordinary skill in the art can understand that the entire or part of the flow in the methods as stated in the embodiments can be implemented by a program instructing related hardware, wherein the program may be stored in a computer readable storage medium and may include one or more of the methods as stated in the embodiments during execution.

In addition, the functional units in each example of the present application may be integrated into one processing module, or each of the units may exist separately and physically, or two or more units may be integrated into one module. The integrated module above may be implemented in the form of hardware or software function module. When the integrated module is implemented in the form of a software function module and sold or used as an independent product, the module may be stored in a computer-readable storage medium.

The storage medium may be a read-only memory, a disk, a compact disc, etc.

The term "an embodiment", "some embodiments", "example", "specific example", "some examples", or the like referred to herein means that particular features, structures, materials, or characteristics described in conjunction with the embodiment or the example may be contained in at least one embodiment or example of the present disclosure. In the specification, the schematic descriptions of the above terms do not necessarily refer to the same embodiment or example. In addition, the described specific features, structures, materials, or characteristics can be combined in any one or more embodiments or examples in a suitable manner.

Although embodiments of the present disclosure have been shown and described above, it should be understood that the above embodiments are only exemplary and not intended to limit the disclosure. Any changes, modifications, replacements, and variants of the embodiments can be made within the scope of the disclosure.

The invention claimed is:

1. A data processing circuit, comprising a machine learning device, a transmission circuit, and a shared memory, and the machine learning device includes at least one machine learning unit, wherein a unicast read operation and a broadcast operation performed by the machine learning unit share a same data receiving interface, the machine learning unit is connected to the transmission circuit through a sending interface and a shared data receiving interface, and the transmission circuit is connected to the shared memory; and the transmission circuit is configured to obtain input data required by the machine learning device from the shared memory according to a data operation signal sent by the machine learning device through the sending interface, and return the input data to the machine learning device through the shared data receiving interface, wherein the sending interface includes: a unicast read signal sending interface and a broadcast signal sending interface, the machine learning unit is connected to the transmission circuit through the unicast read signal sending interface and the shared data receiving interface respectively to implement the unicast read operation, and is connected to the transmission circuit through the broadcast signal sending interface and the shared data receiving interface to implement the broadcast operation.

2. The data processing circuit of claim 1, wherein the machine learning device is configured to perform a machine learning operation according to the input data to obtain output data.

3. The data processing circuit of claim 2, wherein the machine learning device is further configured to transfer the output data to the shared memory through the transmission circuit for data storage.

4. The data processing circuit of claim 1, wherein the transmission circuit includes: a second transmission interface, a read/write processing circuit connected to the second transmission interface, and an arbitration circuit connected to the read/write processing circuit, wherein the read/write processing circuit is configured to receive a data operation signal sent by the at least one machine learning unit through the transmission interface and the second transmission interface, transmit the data operation signal to the arbitration circuit, and return data obtained by the arbitration circuit from the shared memory to the machine learning unit corresponding to the data operation signal through the second transmission interface and the shared data receiving interface; and the arbitration circuit is configured to arbitrate the data operation signal received from the read/write processing circuit according to a preset arbitration rule, and operate the data in the shared memory according to the data operation signal that has been successfully arbitrated.

5. The data processing circuit of claim 4, wherein the read/write processing circuit includes: a unicast read processing circuit and a broadcast processing circuit, wherein the unicast read processing circuit is configured to process a unicast read signal, and the broadcast processing circuit is configured to process a broadcast signal and/or a multicast signal.

6. The data processing circuit of claim 5, wherein the second transmission interface includes: at least one cluster of unicast read signal receiving interfaces and unicast read data sending interfaces that are connected to the unicast read processing circuit, and at least one cluster of broadcast signal receiving interfaces and broadcast data sending interfaces that are connected to the broadcast processing circuit, wherein the unicast read signal receiving interfaces are connected to the unicast read signal sending interfaces of the machine learning unit, the broadcast signal receiving interfaces are connected to the broadcast signal sending interfaces of the machine learning unit, and the unicast read data sending interfaces and the broadcast data sending interfaces in the transmission circuit are respectively connected to the shared data receiving interface of the machine learning unit.

7. The data processing circuit of claim 5, wherein the read/write processing circuit includes: a broadcast processing circuit and a plurality of unicast read processing circuits, wherein the plurality of unicast read processing circuits and the plurality of machine learning units are connected one-to-one, and the broadcast processing circuit and the plurality of machine learning units are connected one-to-many.

8. The data processing circuit of claim 7, wherein the second transmission interface includes: a cluster of broadcast interfaces connected to the broadcast processing circuit, wherein the broadcast interfaces include a broadcast signal receiving interface and a broadcast data sending interface, and the plurality of machine learning units are connected to the broadcast processing circuit through the cluster of broadcast processing interfaces.

9. The data processing circuit of claim 7, wherein the second transmission interface includes: a plurality of clusters of unicast read signal receiving interfaces and shared read data sending interfaces that are one-to-one connected to the plurality of unicast read processing circuit, and a broadcast signal receiving interface that is connected to the broadcast processing circuit, wherein each of the unicast read signal receiving interfaces is connected to each of the unicast read signal sending interfaces of the machine learning unit, each of the broadcast signal receiving interfaces is connected to each of the broadcast signal sending interfaces of the machine learning unit, and each of the shared data sending interfaces is connected to each of the shared data receiving interfaces of the machine learning unit.

10. The data processing circuit of claim 1, wherein the machine learning unit includes at least one operation unit and a controller unit connected to the operation unit, where the operation unit includes a primary processing circuit and a plurality of secondary processing circuits, and the operation unit is connected to the transmission circuit through the sending interface and the shared data receiving interface;

the controller unit is configured to send the data operation signal and the output data to the transmission circuit through the sending interface, receive the input data obtained by the transmission circuit from the shared memory through the shared data receiving interface, and send the input data to the primary processing circuit and/or the secondary processing circuits;

the primary processing circuit is configured to distribute the input data to the plurality of secondary processing circuits;

the plurality of secondary processing circuits are configured to perform intermediate operations in parallel according to the input data to obtain a plurality of intermediate results, and send the plurality of intermediate results to the primary processing circuit; and the primary processing circuit is further configured to perform subsequent processing on the plurality of intermediate results to obtain a computation result.

11. The data processing circuit of claim 1, wherein the input data includes input neuron data and/or weight data, and the output data includes output neuron data.

12. A data processing method applied to a data processing circuit, wherein the data processing circuit includes: a machine learning device, a transmission circuit, and a shared memory, wherein the machine learning device includes at least on machine learning unit, a unicast read operation and a broadcast operation performed by the machine learning unit share a same data receiving interface, and the machine learning unit is connected to the transmission circuit through a sending interface and the shared data receiving interface, and the transmission circuit is connected to the shared memory, wherein the method includes:

sending, by the machine learning device, a data operation signal to the transmission circuit through the sending interface; and obtaining, by the transmission circuit, input data required by the machine learning device from the shared memory according to the data operation signal, and returning the input data to the machine learning device through the shared data receiving interface, wherein the sending interface includes: a unicast read signal sending interface and a broadcast signal sending interface, the machine learning unit is connected to the transmission circuit through the unicast read signal sending interface and the shared data receiving interface respectively to implement the unicast read operation, and is connected to the transmission circuit through the broadcast signal sending interface and the shared data receiving interface to implement the broadcast operation.

* * * * *

UNITED STATES PATENT AND TRADEMARK OFFICE
CERTIFICATE OF CORRECTION

PATENT NO. : 11,880,330 B2
APPLICATION NO. : 17/564492
DATED : January 23, 2024
INVENTOR(S) : Shaoli Liu, Zhen Li and Yao Zhang It is certified that error appears in the above-identified patent and that said Letters Patent is hereby corrected as shown below:

On the Title Page

Please correct Item (54) and in the Specification, Column 1, Lines 1-2, as follows:
Incorrect Title: NETWORK-ON-CHIP DATA PROCESSING METHOD AND DEVICE
Correct Title: UNICAST AND BROADCAST OPERATIONS IN NETWORK-ON-CHIP DATA PROCESSING Signed and Sealed this
Second Day of July, 2024

Katherine Kelly Vidal
*Director of the United States Patent and Trademark Office*